Figure 1:
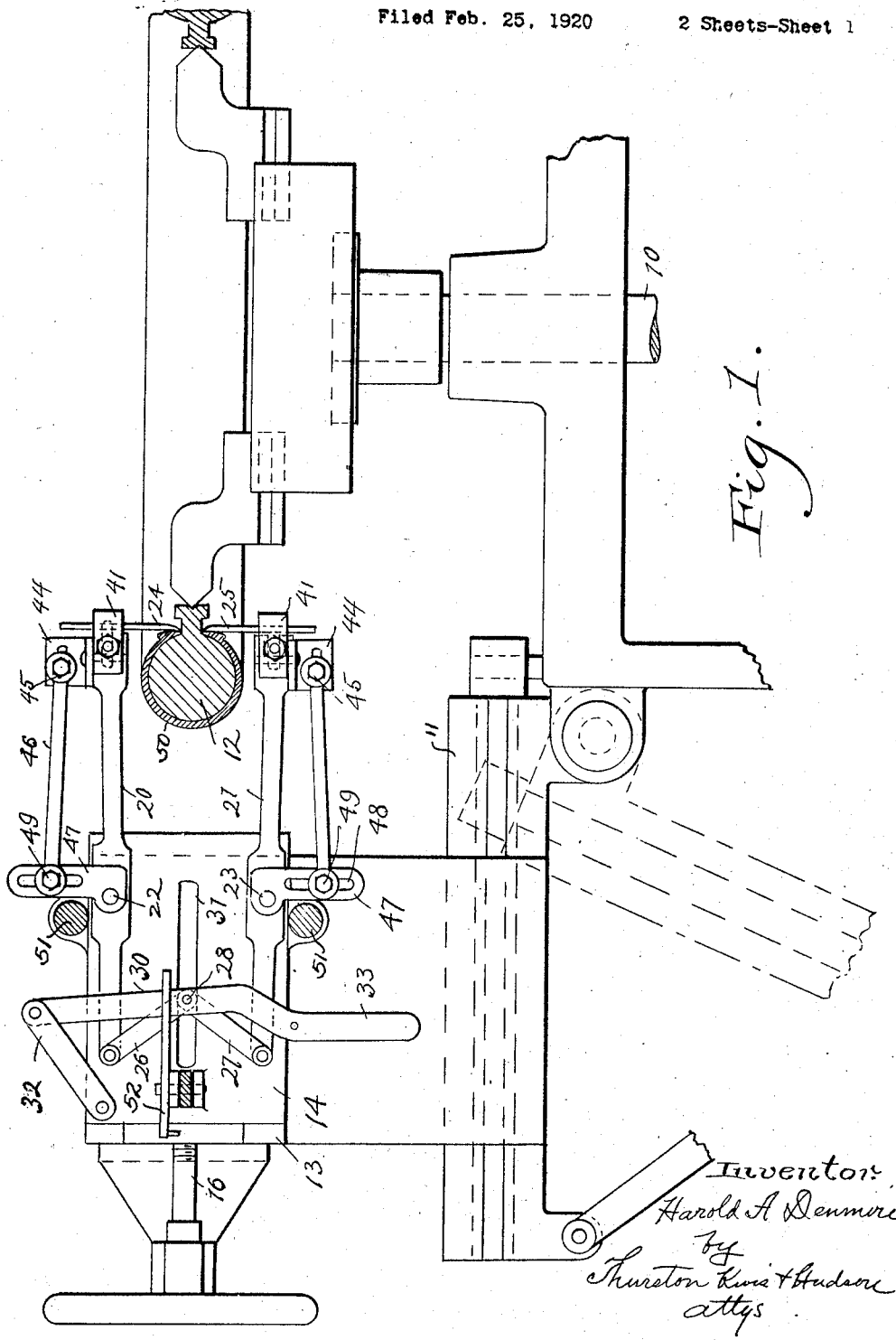

Sept. 22, 1925.
H. A. DENMIRE
TIRE MAKING MACHINE
Filed Feb. 25, 1920    2 Sheets-Sheet 2
1,554,798
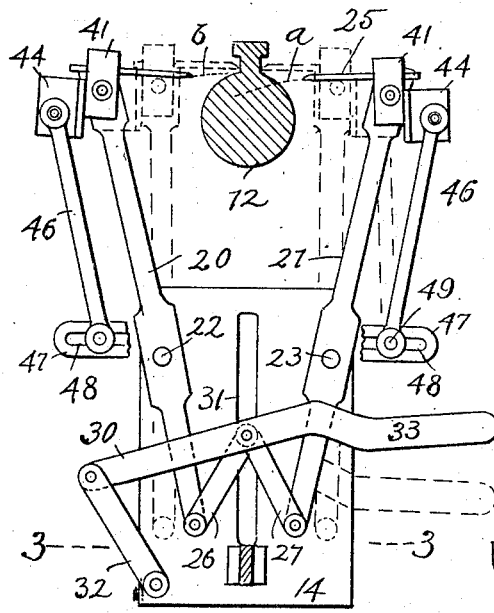
Fig. 2.
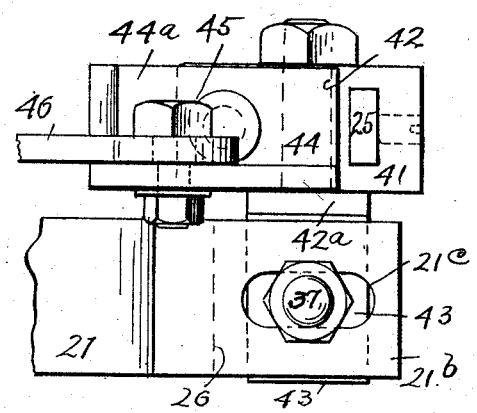
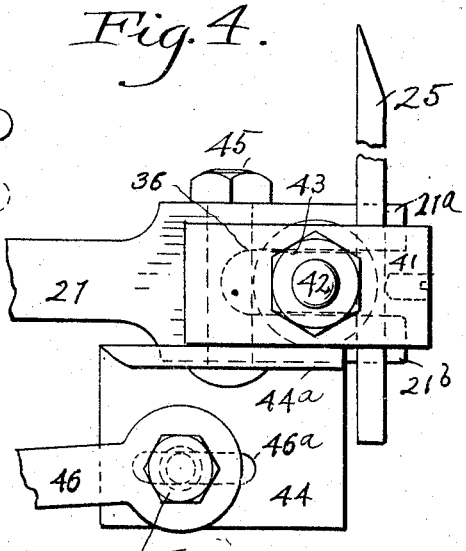
Fig. 4.
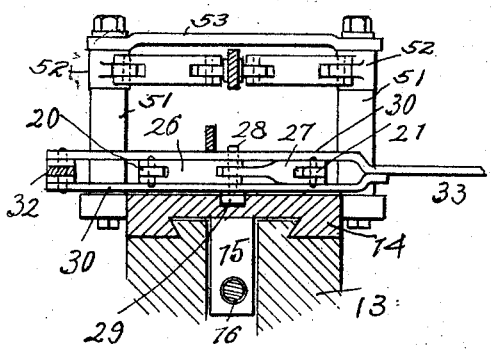
Fig. 3.
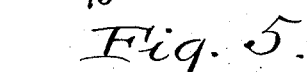
Fig. 5.
Fig. 6.
Inventor
Harold A Denmire
by
Thurston Kwis & Hudson
attys Patented Sept. 22, 1925.

1,554,798

UNITED STATES PATENT OFFICE.

HAROLD A. DENMIRE, OF AKRON, OHIO, ASSIGNOR TO THE GENERAL TIRE & RUBBER COMPANY, OF AKRON, OHIO, A CORPORATION OF OHIO.

TIRE-MAKING MACHINE.

Application filed February 25, 1920. Serial No. 361,162.

*To all whom it may concern:*

Be it known that I, HAROLD A. DENMIRE, a citizen of the United States, residing at Akron, in the county of Summit and State of Ohio, have invented a certain new and useful Improvement in Tire-Making Machines, of which the following is a full, clear, and exact description.

The object of this invention is to enable the operator of a tire making machine to accurately and cleanly trim the surplus material from both edges of the tire carcasses, while the same is still on the core on which it is formed.

In building up a tire casing in a tire making machine, a plurality of layers of friction fabric are successively applied to an annular core while the core is being turned, said core being secured in coaxial relation to a rotatable shaft. The fabric strips as they are applied are stretched circumferentially at the crown of the core; and thereafter the sides of the strips are stitched in smoothly against the sides of the core by mechanism provided for that purpose. There remains more or less surplus material at both edges of the tire casing which must be trimmed off smoothly and evenly. The difficulty of doing this is especially great when the tire casings are of the clincher variety, and have secured at their edges the peculiarly shaped beads which are characteristic of clincher tires.

The present invention includes two trimming knives, mounted on a slide which is movable toward and from the core on which the tire to be trimmed is mounted, and mechanism by which the two knives may be made to move toward and away from opposite sides of the tire, and to follow such paths that the cutting edges of the knives will follow the curvature of the inner edges of the tire.

The invention consists in the construction and combination of parts shown in the drawing and hereinafter described, for supporting and operating the trimming knives, and for so adjusting the said mechanism that it will enable the knives to do the work for which they are provided under all of the different conditions which will arise,— as set forth in the appended claims.

In the drawings, Fig. 1 is a plan view of so much of a tire making machine as is necessary for the disclosure of the present invention. Fig. 2 is a plan view of the trimming mechanism of said machine showing it in a different position from that which it is shown in Fig. 1; Fig. 3 is a sectional front end view in the plane of line 3—3 on Fig. 2; Fig. 4 is an enlarged side elevation; Fig. 5 is an enlarged plan view of the rear end of a knife carrying lever and the parts thereon. Fig. 6 is a detail of the latch.

Referring to the parts by reference characters, 12 represents an annular core on which a tire casing 50 may be built up in the usual manner. 10 represents a rotatable shaft to which the core is connected in the coaxial position by means suitable for the purpose, but which are so well understood in the art that they need not be described here.

A slide 14 is mounted on a bed 13 in such wise that it is movable toward and from the core 12 in a path substantially radial thereto. The bed is carried upon a plate 11 which is swingingly mounted on the frame of the machine as indicated in dotted lines in Fig. 11. This slide has a downwardly projecting lug 15 with which a feed screw 16 engages, said screw being mounted on the bed, so that by turning the feed screw the slide may be moved toward and from the core to bring the knives in proper position with respect to the core and the tire casing thereon.

Two levers 20, 21, are respectively pivoted to the slide on vertical pivots 22, 23. The trimming knives 24, 25, are carried by the front ends of these levers in position such that they may lie on opposite sides of the core. The rear ends of the levers are connected by toggle links 26, 27, which are pivoted together by means of a bolt 28 whose head 29 is slidably fitted in a slot 31 in the top of the slide 14, said slot extending toward the core. An operating lever 30 is pivotally connected with the toggle joint bolt 28; and one end of said lever is pivotally connected with one end of a link 32, the other end of said link being pivoted to the slide. The free end of the lever 30 serves as an operating handle 33. By swinging this handle forward or backward the toggle is operated with the result of moving the front ends of levers 20, 21, equally toward or away from each other and the interposed core. If the knives 24, 25, were fixed to the front ends of the levers 20, 21, the cutting edges of the knives, as the levers swing toward and from the core, would move in the arcs of circles whose centers are the pivot studs 22, 23.

Such paths, however, would not at all accord with the shape of the inner edges of the tire, which the knives are provided to trim, as will be seen by reference to the dotted curved line marked $a$ on Fig. 2, which would represent the path in which the trimming edge of a knife would move if the knife were immovably fixed to the lever; and this obviously is not a path which will enable a knife to trim the tire and follow the curvature of the beaded edge thereof. The path which the cutting edge of the knife should follow is indicated by the dotted line $b$ on Fig. 2.

In order that the path of movement of the knife may be modified so that the cutting edge of the knife may be made to follow this curve or any other analogous curve or straight line corresponding with the shape of the beaded edge of the tire, and to provide the necessary adjustments for practical purposes the following mechanism is provided.

Each of the knives 24, 25, is fixed in a knife block 41, which is pivoted upon and supported by a stud 42. This stud is provided above the lever with a flange $42^a$ on which the knife block rests. The flat shank 43 of the stud goes through a longitudinal slot 36 in the associated lever between the fork arms $21^a$, $21^b$ which result from said slot. A horizontal bolt 37 which goes through slots $21^c$ in said fork arms passes through the flat shank of the stud and affords means for clamping the stud to the lever in any desired position. The stud may be tilted slightly away from the vertical position to thereby vary the inclination of the cutting edge of the knife as circumstances may require.

Associated with each of the knife blocks and the lever upon which it is supported is a lever 46. Each of these levers is pivotally connected at its rear end with a bracket 47 which is fixed to the slide 14,—said pivotal connection being by means of a bolt 49 which is adjustable in a laterally extended slot 48 in the bracket 47. The other end of the lever is pivoted to an angle plate 44 by means of a vertical pivot bolt 45 which may be secured at a proper point in a longitudinal slot $46^a$ in plate 44. This angle plate has a vertical flange $44^a$ by means of which it is bolted to the side of the associated knife block.

When it is desired to use the described trimming mechanism, the front ends of the knife carrying levers are spread apart and the slide 14 is moved as may be required to bring the knives on opposite sides of the core and the untrimmed tire thereon, and into proper relation to the untrimmed edges of said tire. Then while the shaft 10 and core 12 are rotated, the operator by manipulating the lever 30 causes the levers 20, 21, to move toward each other carrying the knives into operative engagement with the untrimmed edges of the tire. But as the levers so move the knife blocks will be caused to swing on the pivot studs 42 so that the trimming edges of the knives are moved a greater or less distance toward the axis of the core while the levers 20, 21 are being moved as stated. This turning of the knife blocks upon their studs is due obviously to the action upon the knife blocks of the levers 46. By shifting the pivot points of these two levers 46 this action may be varied to whatever extent may be necessary to cause the trimming edges of said knives to follow the curvature of the beaded edges of the tire.

In the form of tire making machine shown herein the slide 14 carries the fabric shaping mechanism, which may be of any suitable form, the one preferred being of the spinning type wherein the fabric is shaped by radially moving spinning rolls while the core is rotated. In my companion case Serial No. 361,161 filed herewith, there is shown a preferred type of spinning mechanism, but as the detailed construction thereof is not esential to the understanding of the present invention it will not be shown or described herein. However, the supports for such spinning or stitching rolls are shown these comprising posts 51 which are carried upon the slide 14 and supporting at their upper ends pivoted levers 52 which carry the stitching rolls as will be understood by reference to the copending application. The posts are braced at their upper ends by a cross bar 53.

While these parts are functioning it is obviously desirable that the trimming knives shall not accidentally be moved toward each other. To keep these knives well spread apart so that no accidental hitting of the lever 30 may move them together, a latch 52 is pivoted to the slide and is provided with a shoulder 53 which may drop down in front of the lever 30 and thereby prevent that forward swinging movement thereof which is necessarily incident to the movment of the knives toward each other.

Having described my invention, I claim:

1. In a tire making machine containing means for rotatably supporting an annular core, the combination of a slide, two levers pivoted theron in position such that their rear ends may lie on opposite sides of said core, a knife block pivoted on each lever near the rear end thereof, means for simultaneously swinging the said levers on their pivots to move their rear ends toward and from each other, and means for turning and controlling the turning of said knife blocks upon their pivots as said levers are swung.

2. In a tire making machine containing means for rotatably supporting an annular core, the combination of a slide, two levers pivoted thereon in position such that their rear ends may lie on opposite sides of said core, a knife block pivoted on each lever, a second lever associated with each knife block pivoted to the slide non-concentrically with respect to the first named lever, and connections between the second lever and knife block.

3. In a tire making machine containing means for rotatably supporting an annular core, the combination of a slide, two knife block supporting levers pivoted thereto in position such that their rear ends may lie on opposite sides of said core, and, associated with each of said levers, a knife block pivoted thereon, a plate fixed to said knife block, and a lever pivoted at one end to said plate and at its other end to said slide at a point non-concentric with the associated knife block supporting lever.

4. In a tire making machine containing means for rotatably supporting an annular core, the combination of a slide, two knife block supporting levers pivoted thereto in position such that their rear ends may lie on opposite sides of said core, and, associated with each of said levers, a knife block pivoted thereon, a bracket fixed to said slide and projecting laterally therefrom, a lever having an adjustable pivotal connection with said bracket, a plate with which the other end of said lever is pivotally connected,— which plate is fixed to the said knife block.

5. In a tire making machine containing means for rotatably supporting an annular core, the combination of a slide, two levers pivoted thereto in position such that their rear ends may lie on opposite sides of said core, each lever having a longitudinal vertical slot at its rear end, a stud having a flat shank which is adjustably secured to each lever in said slot and having a flange above the lever, a knife block pivotally mounted on each stud above said flange and resting upon it, an angle plate fixed to the side of each knife block, two brackets fixed to said slide, a lever associated with each bracket and knife block having at its respective ends an adjustable pivotal connection with said bracket and an adjustable pivotal connection with said plate.

6. In a tire making machine, a pivoted lever, a knife on the end of said lever, and means for causing the knife to travel over a path diverging from that imparted to it by the movement of the lever.

In testimony whereof, I hereunto affix my signature.

HAROLD A. DENMIRE.